(12) United States Patent
Potter (10) Patent No.: US 6,597,560 B2
(45) Date of Patent: Jul. 22, 2003

(54) MICRO-ELECTRO-MECHANICAL VARACTOR AND A METHOD OF MAKING AND USING THEREOF

(75) Inventor: Michael D. Potter, Churchville, NY (US)

(73) Assignee: Rochester Institute of Technology, Rochester, NY (US)

( * ) Notice: Subject to any disclaimer, the term of this patent is extended or adjusted under 35 U.S.C. 154(b) by 0 days.

(21) Appl. No.: 10/096,398

(22) Filed: Mar. 12, 2002

(65) Prior Publication Data

US 2002/0131230 A1 Sep. 19, 2002

Related U.S. Application Data

(60) Provisional application No. 60/275,288, filed on Mar. 13, 2001.

(51) Int. Cl.$^7$ .................................................. H01G 7/00
(52) U.S. Cl. ........................ 361/277; 361/278; 361/279; 361/283.1; 361/291; 361/290
(58) Field of Search ................................. 361/277, 278, 361/281, 321.1, 280, 300, 321.5, 313, 289, 290, 287, 283, 311, 322, 293

(56) References Cited

U.S. PATENT DOCUMENTS

| | | | |
|---|---|---|---|
| 4,490,772 A | * | 12/1984 | Blickstein |
| 4,716,331 A | * | 12/1987 | Higgins, Jr. |
| 5,081,513 A | * | 1/1992 | Jackson et al. |
| 5,526,172 A | | 6/1996 | Kanack |
| 5,771,148 A | * | 6/1998 | Davis |
| 5,959,516 A | | 9/1999 | Chang et al. |
| 6,094,102 A | | 7/2000 | Chang et al. |
| 6,177,351 B1 | | 1/2001 | Beratan et al. |

OTHER PUBLICATIONS http://ucsub.colorado.edu/~maz/research/background.html [Retrieved from Web site on Apr. 4, 2001].
http://www.ece.ncsu.edu/erl/damemi/switchproj.html#Array [Retrieved from Web site on Apr. 4, 2001].
http://www.eecs.umich.edu/RADLAB/bio/rebeiz/Current_Research.html [Retrieved from Web site on Apr. 4, 2001].
A. R. Brown et al., "A Varactor–Tuned RF Filter," *IEEE Transaction On Microwave Theory And Techniques*, 48:1157–1160 (2000).

* cited by examiner

Primary Examiner—Dean A. Reichard
Assistant Examiner—Nguyen Ha
(74) Attorney, Agent, or Firm—Nixon Peabody LLP (57) ABSTRACT

A varactor includes a first capacitor plate, a second capacitor plate, at least one fixed charge holder, and a control electrode. The second capacitor plate is spaced from and movable towards and away from the first capacitor plate. At least one fixed charge holder with an imbedded charge is on at least a portion of the second capacitor plate. The control electrode is spaced from the second capacitor plate. Applying a bias to the control electrode moves the second capacitor plate towards or away from the first capacitor plate depending on the polarity of the applied bias.

7 Claims, 6 Drawing Sheets

MICRO-ELECTRO-MECHANICAL VARACTOR AND A METHOD OF MAKING AND USING THEREOF

The present invention claims the benefit of U.S. Provisional Patent Application Serial No. 60/275,288, filed Mar. 13, 2001, which is hereby incorporated by reference in its entirety.

FIELD OF THE INVENTION

This invention relates generally to micro-electo-mechanical components and, more particularly, to a micro-electro-mechanical (MEMS) varactor and a method of making and using thereof.

BACKGROUND OF THE INVENTION

A variable capacitor, also known as a varactor, is widely used in many circuit applications. For example, varactors have been used for many years in the radio industry. Previously, these varactors were interdigitated metal leaves with variable overlap area and the dielectric was air.

With the advent of semiconductor devices, p-n junctions were used to form varactors. Since the space charge region of semiconductor p-n junctions varies approximately as the square root of the applied bias, variable capacitance in these varactors is obtained by simply changing the applied bias. However, this leads to the constraint of defining the varactor DC bias dynamically.

Varactors using MEMs technology have been constructed as disclosed at www.eecs.umich.edu/RADLAB/bio/rebeiz/Current Research.html, which is herein incorporated by reference. Unfortunately, these varactors have a capacitance ratio of only on the order of 1.5:1 and 2.5:1. Additionally, these varactors have a fairly large mass which limits their response time.

SUMMARY OF THE INVENTION

A varactor in accordance with one embodiment of the present invention includes a first capacitor plate, a second capacitor plate, at least one fixed charge holder, and a control electrode. The second capacitor plate is spaced from and movable towards and away from the first capacitor plate. At least one fixed charge holder with an imbedded charge is on at least a portion of the second capacitor plate. The control electrode is spaced from the second capacitor plate.

A method of using a varactor in accordance with another embodiment of the present invention includes applying a first potential with the first polarity to a control electrode and moving a first capacitor plate towards or away from a second capacitor plate based on the first polarity of the applied first potential.

A method of making a varactor in accordance with another embodiment of the present invention includes providing first and second capacitor plates with the second capacitor plate spaced from and movable towards and away from the first capacitor plate. At least one fixed charge holder is formed on at least a portion of the second capacitor plate. Charge is imbedded in the at least one fixed charge holder. A control electrode is provided that is spaced from the second capacitor plate.

A method for making a varactor in accordance with another embodiment of the present invention includes filling a first trench in a first insulating material with a first conductive material to form a first capacitor plate. A second insulating material is deposited on at least a portion of the first insulating material. A second trench is formed in a portion of the second insulating material which extends to the first insulating material and is located over at least a portion of the first capacitor plate. The second trench is filled with a first sacrificial material. A second conductive material is deposited over at least a portion of the first sacrificial material and the second insulating material to form a second capacitor plate. A charge holding film is deposited over at least a portion of the second capacitor plate. A third insulating material is deposited over at least a portion of the charge holding film. A third trench is formed in a portion of the third insulating material which extends to the charge holding film. The third trench is filled with a second sacrificial material. A third conductive material is deposited over at least a portion of the second sacrificial material and the third insulating material to form a control electrode. Charge is imbedded in the charge holding film. The first and second sacrificial materials are removed to form a chamber.

The present invention provides a varactor which uses a push-pull technique utilizing fixed static charge. This varactor has a wider dynamic range than prior varactors on the order of at least 4:1. Additionally, the present invention significantly reduces the overall mass of the varactor and increases the force used to modulate a movable capacitor plate compared to prior varactors. As a result, the present invention has a much faster response time than prior MEMS varactors. The present invention can be used in a variety of different applications, such as in wireless communications, global positioning system, and/or cell phones.

DETAILED DESCRIPTION

Figure 1:
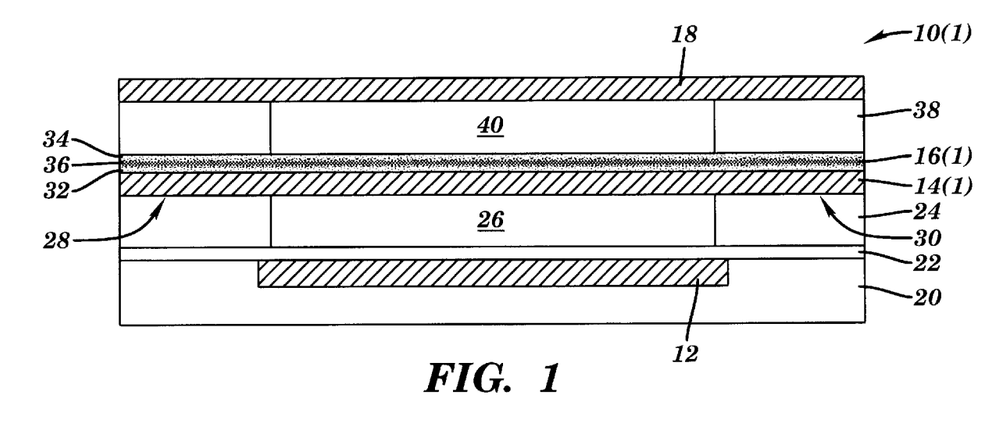
FIG. 1 is a side, cross-sectional view of a varactor in accordance with at least one embodiment of the present invention.

A varactor 10(1) in accordance with one embodiment of the present invention is illustrated in FIG. 1. The varactor 10(1) includes a first capacitor plate 12, a second capacitor plate 14(1), at least one fixed charge holder 16(1), and a control electrode 18. The present invention provides a varactor 10(1) which uses a push-pull techniques utilizing fixed static charge and has a faster response time and wider dynamic range than prior varactors.

Referring more specifically to FIG. 1, the varactor 10(1) includes a first capacitor plate 12. In this embodiment, the first capacitor plate 12 is fixed in an insulator 20, although other configurations can be used. In this embodiment, the first capacitor plate 12 is made of chrome, although another type of conductive material or materials can be used.

An insulator 22 is on a surface the first capacitor plate 12. The insulator 22 forms part of the dielectric between the first capacitor plate 12 and the second capacitor plate 14(1). The insulator 22 also acts as an etch stop layer for etching in insulator 24. The insulator 22 is made of $Si_3N_4$, although another type of insulating material or materials comprising one or more layers could be used. Although an insulator 27 is shown, the insulator 22 could comprise multiple layers of insulating material or could be left out entirely.

Another insulator 24 is on a surface of the insulator 22 and has an opening 26 which extends through the insulator 24 to the insulator 22. The insulator 24 is made of a different material or materials than insulator 22 so that insulator 22 can act as an etch stop. In this embodiment, insulator 24 is made of $SiO_2$, although another type of insulating material or materials comprising one or more layers could be used. The opening 26 in the insulator 24 is a vacuum, although opening could be filled with a gas or gases, such as air.

Figure 4:
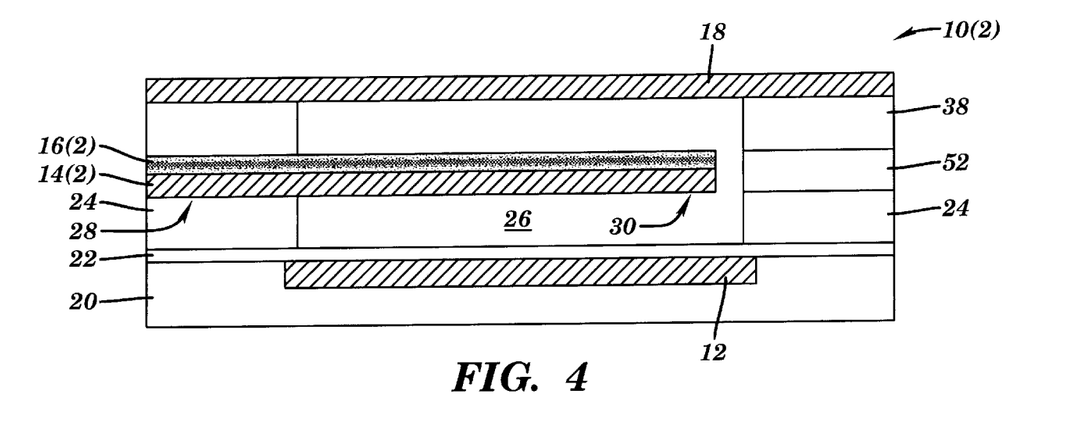
FIG. 4 is a side, cross-sectional view of a varactor in accordance with at least one embodiment of the present invention.

The second capacitor plate 14(1) is on opposing sides of the opening 26 on the insulator 24, although other arrangements are possible, such as having the second capacitor plate 14(2) secured to the insulator 24 along one edge or end 28 and extending into the opening 26 and with another edge or end 30 spaced from the other side of the insulator 24 as shown in the embodiment in FIG. 4. Referring back to FIG. 1, the second capacitor plate 14(1) is flexible and can move towards or away from the first capacitor plate 12 to change the capacitance of the capacitor in the varactor formed by the first and second capacitor plates 12 and 14(1) separated by the insulator 22 and the space in the opening 26 in the insulator 24. In this embodiment, the second capacitor plate 14(1) is made of aluminum, although another type of conductive material or materials comprising one or more layers can be used.

A fixed or static charge holder 16(1) is connected to a surface of the second capacitor plate 14(1). In this embodiment, the fixed charge holder 16(1) comprises a pair of insulators 32 and 34 which hold imbedded charge at an interface 36 (illustrated more clearly in FIGS. 10–12), although other arrangements for the fixed charge holder 16(1) can be used, such as a single layer of material or multiple layers of a material or materials. In this embodiment, the insulator 32 is made of $SiO_2$ and the insulator 34 is made of $Si_3N_4$, although another insulating material or materials comprising one or more layers could be used for insulators 32 and 34.

Another insulator 38 is on a surface of the fixed charge holder 16(1) and has an opening 40 which extends through the insulator 38 to the insulator 34 which forms part of the fixed charge holder 16(1). The opening 40 in the insulator 38 is filled with air, although other types of gases could be in the opening or vacuum. In this embodiment, the insulator 38 is made of $SiO_2$, although another type of insulating material or materials comprising one or more layers could be used.

Figure 2:
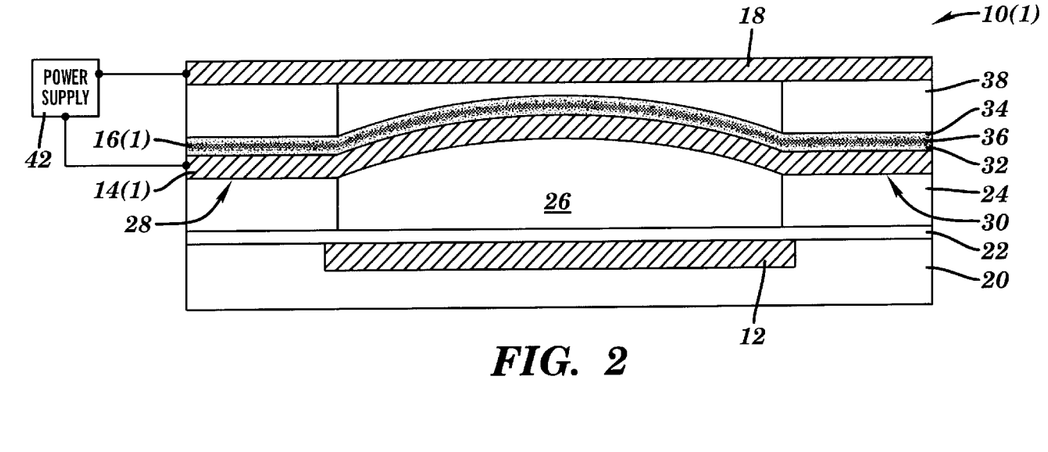
FIG. 2 is side, cross-sectional views of the varactor shown in FIG. 1 in use to decrease capacitance.
Figure 3:
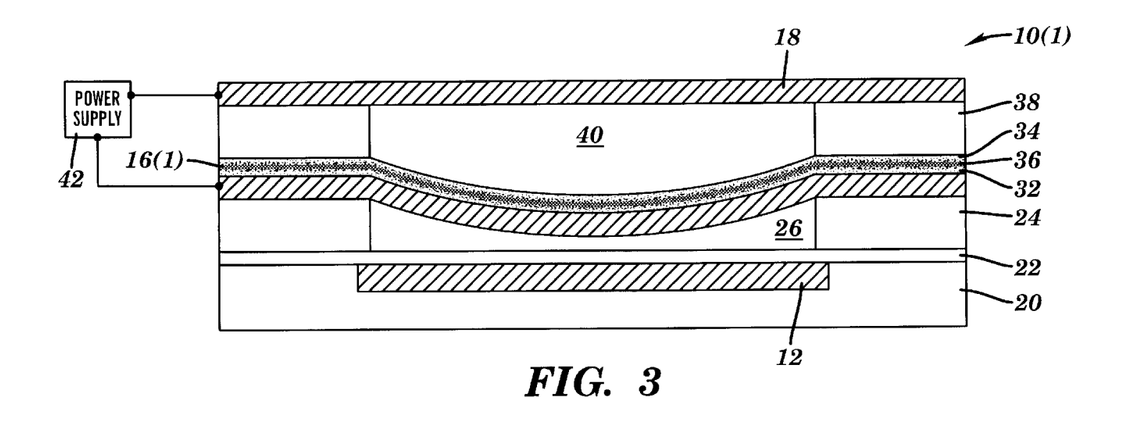
FIG. 3 is a side, cross-sectional views of the varactor shown in FIG. 1 in use t to increase capacitance.

The control electrode 18 is on the insulator 38 over the opening 40, although other arrangements for the control electrode 18 can be used. The control electrode 18 is coupled to a power supply 42 as shown in FIGS. 2 and 3 and applied basis from the power supply 42 is used to control movement of the fixed charge holder 16(1) and thus the second capacitor plate 14(1). In this embodiment, the control electrode 18 is made of aluminum, although another type of conductive material or materials comprising one or more layers could be used.

An access hole extends through the varactor 10(1) and is sealed with a plug, although other numbers of access holes can be used and the access hole or holes could be located elsewhere on the varactor. The access hole and plug are not illustrated. The sacrificial materials 48 and 50 (shown in FIGS. 12–14) in the openings 26 and 40 in insulators 24 and 38 are removed via the access hole.

The operation of the varactor 10(1) will be described with reference to FIGS. 2 and 3. Referring more specifically to FIG. 2. when the power supply 42 applies a bias on the control electrode 18 that has an opposite polarity as the stored charge on the fixed charge holder 16(1), the fixed charge holder 16(1) is pulled towards the control electrode 18. Pulling the fixed charge holder 16(1) towards the control electrode 18, pulls the second capacitor plate 14(1) connected to the fixed charge holder 16(1) towards the control electrode 18 and away from the first capacitor plate 12 decreasing the capacitance value of the varactor 10(1). As a result, the vacuum or other material, such as a gas, in the opening 26 forms a significant portion of the dielectric between capacitor plates 12 and 14(1).

Referring to FIG. 3. when the power supply 42 applies a bias on the control electrode 18 that has the same polarity as the stored charge on the fixed charge holder 16(1), the fixed charge holder 16(1) is pushed away from the control electrode 18. Pushing the fixed charge holder 16(1) away from the control electrode 18, pushes the second capacitor plate 14(1) connected to the fixed charge holder 16(1) away from the control electrode 18 and towards the first capacitor plate 12 increasing the capacitance value of the varactor 10(1). As a result, insulating layer 22 forms a significant portion of the dielectric between capacitor plates 12 and 14(1). The maximum value for the capacitance of the varactor 10(1) is obtained when a significant portion of the second capacitor plate 14(1) is in direct contact with insulator 22.

Accordingly, the present invention provides a varactor 10(1) with an extended dynamic range over prior MEMS varactors. The ratio of maximum to minimum capacitance in varactor 10(1) is on the order of at least 4:1. Additionally, the present invention significantly reduces the overall mass of the varactor 10(1) and increases the force used to modulate a movable capacitor plate 14(1) compared to prior MEMs varactors. As a result, the present invention also has a much faster response time than prior MEMS varactors.

Referring to FIG. 4, another embodiment of the varactor 10(2) is illustrated. The components and operation of the varactor 10(2) shown in FIG. 4 are identical to those for the varactor shown and described with reference FIG. 1, except as described herein. Components in FIG. 4 which are identical to components in FIG. 1 have the same reference numeral as those in FIG. 1. As discussed earlier in FIG. 4, the second capacitor plate 14(2) is secured to the insulator 24 along one end or edge 28 and extends into the opening and has another edge or end 30 spaced from the other side of the insulator 24. As a result, the second capacitor plate 14(2) is more flexible for movement towards and away from the first capacitor plate 12 depending on the applied bias and thus has a higher dynamic range than the capacitor plate 14(1) shown in the varactor in FIG. 1. The ratio of maximum to minimum capacitance of the varactor 10(2) shown in FIG. 4 is on the order of at least 4:1. The varactor 10(2) also has a fixed charge holder 16(2). In this embodiment, the insulator 52 is made of $SiO_2$, although another type of insulating material or materials comprising one or more layers could be used.

Figure 5:
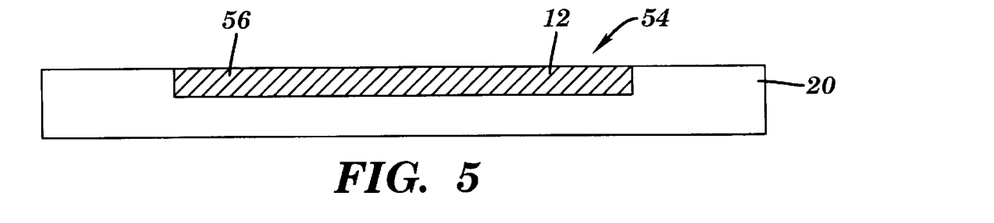
FIGS. 5–15 are side, cross-sectional view of a method of making the varactor shown in FIG. 1 in accordance with at least one embodiment of the present invention.

A method of making a varactor 10(1) in accordance with one embodiment of the present invention is described with reference to FIGS. 5–15. Referring more specifically to FIG. 5, an opening or trench 54 is formed in either a base insulator 20, although the trench 54 could be formed in other materials, such as in an insulator film on a substrate. In this embodiment, the base insulator 20 is made of silicon dioxide, although another material or materials could be used. The trench 54 is formed by etching, although other techniques for forming the trench 54 could be used.

The trench 54 is filled with a conductive material 56 that forms the first capacitor plate 12. The conductive material 56 is chrome, although another conductive material or materials comprising one or more layers could be used. The conductive material in the trench forms the first capacitor plate 12. The conductive material can be planarized.

Figure 6:
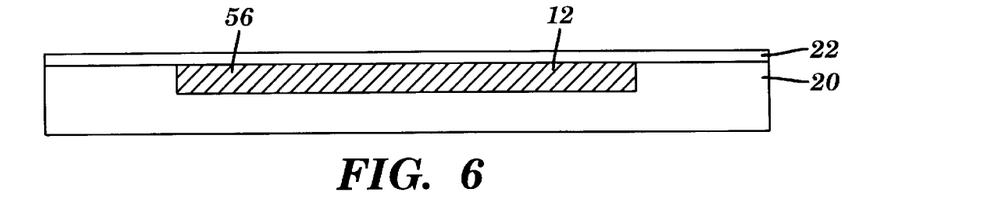

Referring to FIG. 6, once the first capacitor plate 12 is formed, an insulator 22 is deposited on the base insulator 20 and the conductive material 56 and forms part of the dielectric for the varactor 10(1). The insulator is $Si_3N_4$, although another material or materials comprising one or more layers could be used, such as $SiO_2$ ($\epsilon$~3.85), $Al_2O_3$ ($\epsilon$~12), $Ta_2O_5$ ($\epsilon$~24). The thickness and permmitivity of this insulator 22 will define the maximum capacitance of the varactor 10(1).

Figure 7:
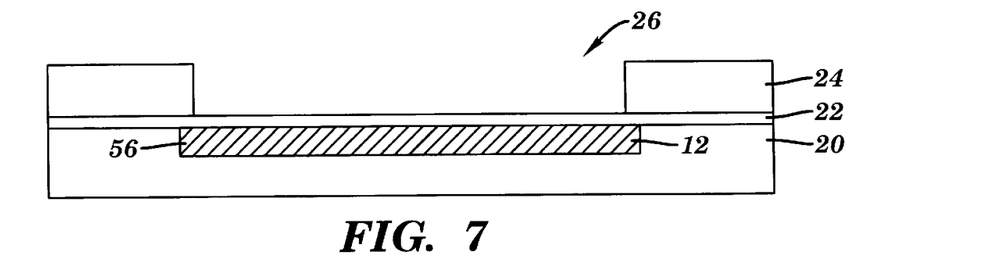

Referring to FIG. 7, once the insulator 22 that forms part of the dielectric for the varactor 10(1) is formed, an insulator 24 is deposited on the insulator 22. Insulator 24 is made of a different material than the insulator 22 so the insulator 22 can act as an etch stop layer. In this embodiment, the insulator 24 is made of $SiO_2$, although another material or materials comprising one or more layers could be used. An opening or trench 26 is etched in to the insulator 24 that extends to the insulator 22. The opening 26 forms part of the dielectric for the varactor 10(1). Although opening 26 is formed by etching, other techniques for forming opening 26 can be used.

Figure 8:
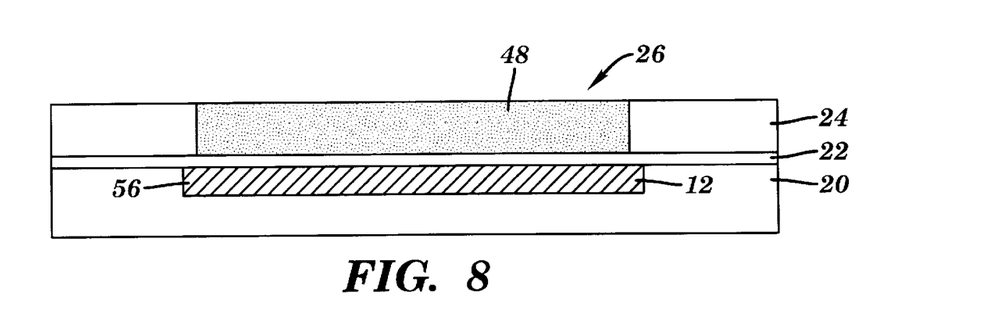

Referring to FIG. 8, next the opening 26 in the insulator 24 is filled with a sacrificial material 48, such as poly silicon although another material or materials can be used. The sacrificial material 48 can be planarized.

Figure 9:
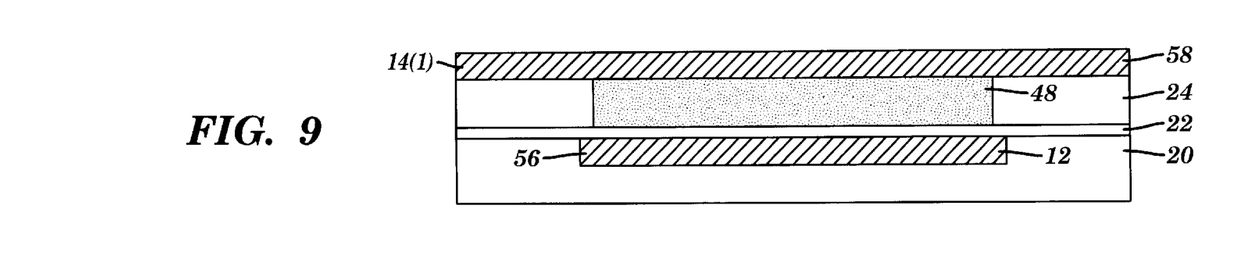

Referring to FIG. 9, next a conductive material 58 is deposited on the insulator 24 and the sacrificial material 48 to form the second capacitor plate 14(1). The conductive material 58 is patterned to an appropriate shape for the second capacitor plate 14(1). In this embodiment, the second capacitor plate 14(1) extends completely across the sacrificial material 48, although other configurations are possible. For example, the second capacitor plate 14(2) may extend partially across the sacrificial material 48 with connected at one end or edge 28 connected to the insulator 24 and has another end or edge 30 spaced from the insulator 24 as illustrated in FIG. 4. The second capacitor plate 14(1) is flexible and is made of aluminum, although another material or materials comprising one or more layers could be used.

Figure 10:
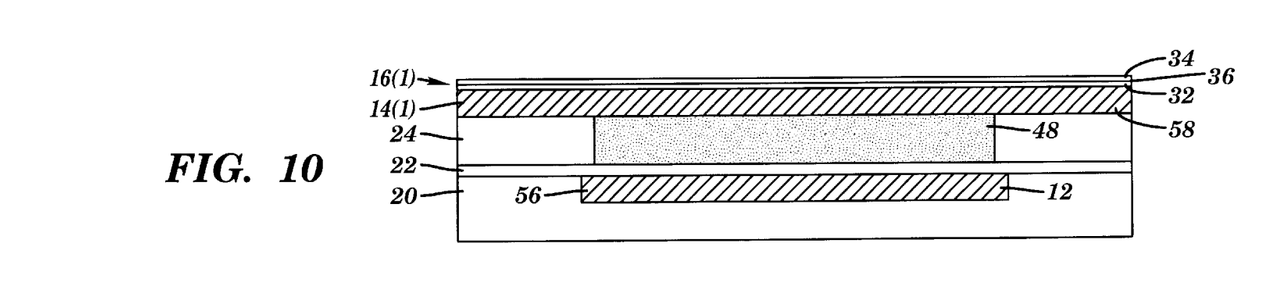

Referring to FIG. 10, once the second capacitor plate 14(1) is formed, an insulator 32 is deposited on the second capacitor plate 14(1) and another insulator 34 is deposited on the insulator to form a fixed charge holder 16(1) which holds charge at or around an interface 36. Although insulators 32 and 34 are used to form the fixed charge holder 16(1), other numbers of insulators can be used. The insulator 32 is made of $SiO_2$ and the insulator 34 is made of $Si_3N_4$, although another material or materials comprising one or more layers could be used.

Figure 11:
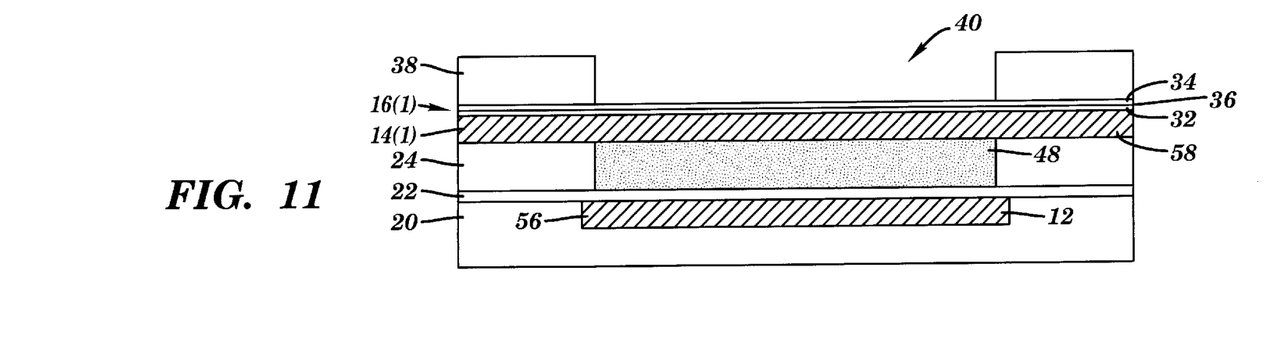

Referring to FIG. 11, once the fixed charge holder 16(1) is formed, an insulator 38 is deposited on the insulator. The insulator 38 is made of a different material than the insulator 34 so the insulator 34 can act as an etch stop layer. The insulator 38 is made of $SiO_2$, although another material or materials comprising one or more layers could be used. An opening or trench 40 is etched in to the insulator 38 that extends to the insulator 34. The opening 40 provides room for the second capacitor plate 14(1) to flex away from the first capacitor plate 12 and towards control electrode 18. Although opening 40 is formed by etching, other techniques for forming opening 40 can be used.

Figure 12:
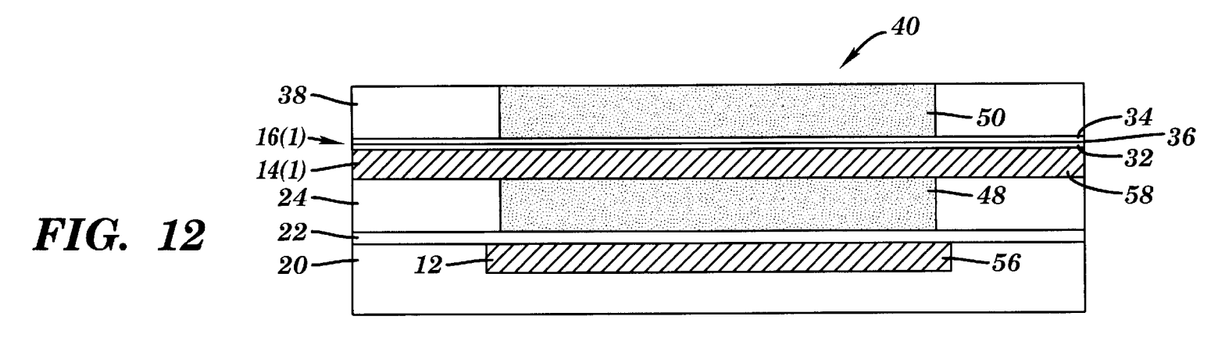

Referring to FIG. 12, next the opening or trench 40 in insulator 38 is filled with a sacrificial material 50, such as poly silicon although another material or materials can be used. The sacrificial material 50 can be planarized.

Figure 13:
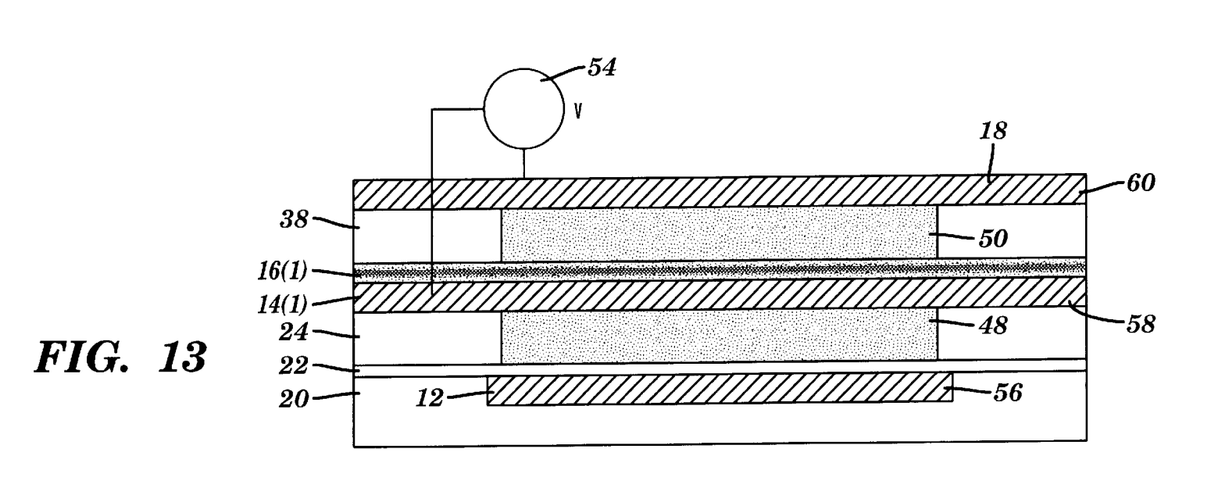

Referring to FIG. 13, next a conductive material 60 is deposited on the insulator 38 and the sacrificial material 50 to form the control electrode 18. The conductive material 60 is made of aluminum, although another material or materials comprising one or more layers could be used.

Once the control electrode 18 is formed, a bias from a power supply 54 is applied to the control electrode 18 and the second capacitor plate 14(1) to imbed charge on the fixed charge holder 16(1). The charge is stored at the interface 36 between the insulators 32 and 34, although the charge can be stored elsewhere depending on the type of fixed charge holder 16(1). Once charge is imbedded on the fixed charge holder 16(1), the power supply 54 is disconnected from the control electrode 18 and the second capacitor plate 14(1). Although one technique for imbedding charge on the fixed charge holder 16(1) is shown, other techniques can be used, such as injecting charge into the fixed charge holder 16(1) with a ballistic energy source.

Figure 14:
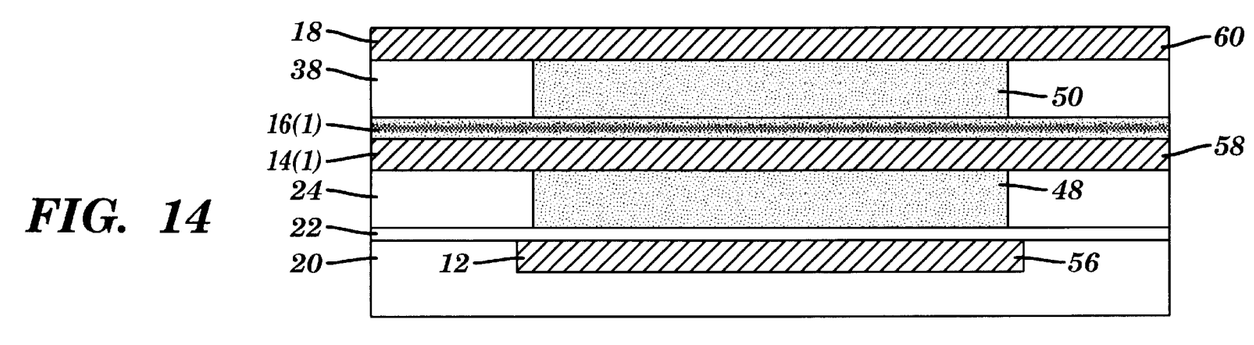

Referring to FIG. 14, once charge is imbedded in the fixed charge holder 16(1), an access hole is etched through varactor 10(1) to provide access to sacrificial materials 48 and 50. Although one access hole is shown, other numbers of access holes can be formed through other layers to sacrificial materials 48 and 50. Although access hole is formed by etching, other techniques for forming hole can be used. Holes to contact other components in varactor 10(1) or 10(2), such as first capacitor plate 12, second capacitor plate 14(1), or 14(2), and control electrode 18 may also be etched or otherwise formed at this time.

Figure 15:
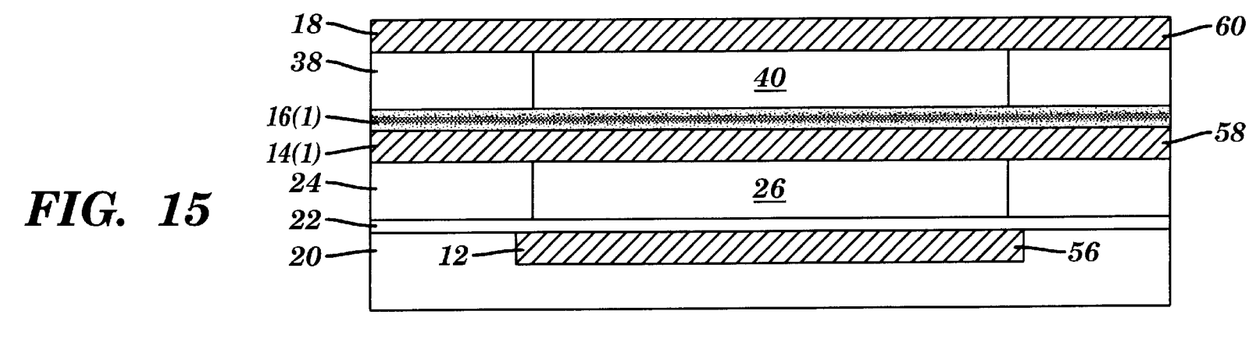

Referring to FIG. 15, once the access hole is formed, the sacrificial materials 48 and 50 are removed via the access hole. In this embodiment, xenon difluoride is used to remove the sacrificial materials 48 and 50, although another material or materials could be used and other techniques for removing the sacrificial material 48 and 50 could be used.

Referring to FIG. 1, the access hole in varactor 10(1) filled with the plug. In this embodiment, the plug is made of aluminum, although another material or materials comprising one or more layers could be used. Once the access hole is sealed, the varactor 10(1) is ready for use. Accordingly, as illustrated by the above discussion, the varactor 10(1) is easy to manufacture. Further, the resulting varactor has a wider dynamic range and a faster response time than was previously possible with prior varactors. In other embodiments, the capacitor formed between control electrode 18 and second capacitor plate 14(1) or 14(2) may also be used, with or without the capacitor formed between first capacitor plate 12 and second capacitor plate 14(1) or 14(2).

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefor, is not intended to limit the claimed processes to any order except as may be specified in the claims. Accordingly, the invention is limited only by the following claims and equivalents thereto.

What is claimed is:

1. A varactor comprising:

a first capacitor plate;

a second capacitor plate spaced from and movable towards and away from the first capacitor plate;

at least one fixed charge holder with an imbedded fixed charge on at least a portion of the second capacitor plate; and a control electrode spaced from the second capacitor plate.

2. The varactor as set forth in claim 1 further comprising at least one first insulator between and connecting the first and second capacitor plates, the at least one first insulator having a first chamber which extends between the first and second capacitor plates.

3. The varactor as set forth in claim 2 further comprising at least one second insulator between the second capacitor plate and the control electrode, the at least one second insulator having a second chamber which extends between the second capacitor plate and the control electrode.

4. The varactor as set forth in claim 2 further comprising at least one dielectric material on the first capacitor plate and between the first and second capacitor plates.

5. The varactor as set forth in claim 3 wherein the second capacitor plate is connected at or adjacent at least one end to the at least one first and second insulators.

6. The varactor as set forth in claim 3 wherein the second capacitor plate is connected at or adjacent at least opposing ends to the at least one first and second insulators.

7. The varactor as set forth in claim 1 wherein the at least one fixed charge holder comprises at least two insulating layers on at least a portion of the second capacitor plate with the imbedded fixed charge at an interface between the two insulating layers.

* * * * *